US012571256B2

(12) United States Patent
Jiang

(10) Patent No.: US 12,571,256 B2
(45) Date of Patent: Mar. 10, 2026

(54) ELECTRIC CURTAIN SYSTEM AND TRAVEL SETTING METHOD THEREOF

(71) Applicant: NINGBO SUNFREE MOTOR TECHNOLOGY COMPANY LIMITED, Ningbo City (CN)

(72) Inventor: Chun Jiang, Ningbo City (CN)

(73) Assignee: NINGBO SUNFREE MOTOR TECHNOLOGY COMPANY LIMITED, Ningbo City (CN)

( * ) Notice: Subject to any disclaimer, the term of this patent is extended or adjusted under 35 U.S.C. 154(b) by 0 days.

(21) Appl. No.: 19/084,675

(22) Filed: Mar. 19, 2025

(65) Prior Publication Data

US 2026/0015907 A1 Jan. 15, 2026

(30) Foreign Application Priority Data

Jul. 11, 2024 (CN) ........................ 202410930756.X

(51) Int. Cl.
*E06B 9/72* (2006.01)
*E06B 9/40* (2006.01)
*E06B 9/68* (2006.01)

(52) U.S. Cl.
CPC .................. *E06B 9/72* (2013.01); *E06B 9/40* (2013.01); *E06B 2009/6809* (2013.01)

(58) Field of Classification Search
CPC ...... E06B 2009/6809; E06B 9/68; E06B 9/72; E06B 9/40; E06B 9/56; E06B 9/32
See application file for complete search history.

(56) References Cited

U.S. PATENT DOCUMENTS

2017/0167193 A1* 6/2017 Slivka ........................ E06B 9/72
2023/0019542 A1* 1/2023 Dupielet ................. E06B 9/322
2023/0151690 A1* 5/2023 Menendez ................ E06B 9/42
318/255

FOREIGN PATENT DOCUMENTS

CN 111202417 A * 5/2020 ............. G08C 17/00
CN 109577847 B * 12/2020 ............... E06B 9/88

OTHER PUBLICATIONS

Machine translation CN109577847 (Year: 2020).*
Machine translation CN111202417 (Year: 2020).*

* cited by examiner

*Primary Examiner* — Johnnie A. Shablack
*Assistant Examiner* — Jeremy C Ramsey
(74) *Attorney, Agent, or Firm* — Juan Carlos A. Marquez; Marquez IP Law Office, PLLC

(57) ABSTRACT

The present disclosure relates to the technical field of electric curtains and in particular to an electric curtain system and a travel setting method thereof. The system comprises a motor and a controller. The controller is electrically connected with the motor. The electric curtain system further comprises at least two travel setting keys, which are an up travel setting key and a down travel setting key respectively. The up travel setting key and the down travel setting key are both electrically connected with the controller. This travel setting method helps the users perform travel setting in a convenient way.

2 Claims, 2 Drawing Sheets

ELECTRIC CURTAIN SYSTEM AND TRAVEL SETTING METHOD THEREOF

TECHNICAL FIELD

The present disclosure relates to the technical field of electric curtains and in particular to an electric curtain system and a travel setting method thereof.

BACKGROUND

Curtain is one of indispensable articles in the daily lives, which is mainly used to protect the personal privacy of the users and achieve the functions of light blocking and dust blocking and the like. Curtains can be divided into two types: manual curtains and electric curtains. The electric curtains usually include a remote controller which can be used to set the curtains and control the curtains to be on or off.

In the prior arts, travel setting can usually be performed on the electric curtains, that is, an up travel position and a down travel position are set based on user requirements. However, because the travel setting function is on the remote controller, the user needs to first match the remote controller with the curtain body before performing travel setting. This matching process includes many steps and so it is inconvenient for ordinary people and especially for the elderly to perform such operations. Secondly, the remote controller of the electric curtains in the prior arts usually uses a control mode of one key for multiple uses and combination key, leading to complex operation of the remote controller. In this case, the user may be easily confused about the travel setting or carry out mis-operations, bringing inconvenience to the use.

SUMMARY

In order to address the above technical problems, the present disclosure provides an electric curtain system and a travel setting method thereof, so as to help users to perform travel setting.

The present disclosure provides the following technical solution: there is provided an electric curtain system, which comprises a motor and a controller. The controller is electrically connected with the motor. The electric curtain system further comprises at least two travel setting keys, which are an up travel setting key and a down travel setting key respectively. The up travel setting key and the down travel setting key are both electrically connected with the controller.

Preferably, the electric curtain system further comprises a mounting housing in which the motor and the controller are disposed. The up travel setting key and the down travel setting key are disposed on an outer side of a side part of the mounting housing.

Preferably, the electric curtain system further comprises a pause key electrically connected with the controller to control a curtain to stop moving.

There is provided a travel setting method of the electric curtain system, which comprises an up travel setting method and a down travel setting method. The up travel setting method is set by the up travel setting key and the down travel setting method is set by the down travel setting key.

Preferably, the up travel setting method specifically comprises the following steps:

A1, short-pressing the up travel setting key to control the motor to bring the curtain to rise;

A2, when the curtain rises to an up travel position to be set by the user, short-pressing the up travel setting key or the down travel setting key to control the curtain to stop, and then long-pressing the up travel setting key to complete the up travel setting of the curtain.

The down travel setting method specifically comprises the following steps:

B1, short-pressing the down travel setting key to control the motor to bring the curtain to descend;

B2, when the curtain descends to a down travel position to be set by the user, short-pressing the up travel setting key or the down travel setting key to control the curtain to stop, and long-pressing the down travel setting key to complete the down travel setting of the curtain.

Preferably, the up travel setting method specifically comprises the following steps:

A1, short-pressing the up travel setting key to control the motor to bring the curtain to rise;

A2, when the curtain rises to the up travel position to be set by the user, short-pressing the up travel setting key or the down travel setting key to control the curtain to stop and then double-clicking the up travel setting key to complete the up travel setting of the curtain.

The down travel setting method specifically comprises the following steps:

B1, short-pressing the down travel setting key to control the motor to bring the curtain to descend;

B2, when the curtain descends to the down travel position to be set by the user, short-pressing the up travel setting key or the down travel setting key to control the curtain to stop, and then double-clicking the down travel setting key to complete the down travel setting of the curtain.

Preferably, the up travel setting method specifically comprises the following steps:

A1, continuously pressing the up travel setting key to control the motor to bring the curtain to rise;

A2, when the curtain rises to the up travel position to be set by the user, releasing the up travel setting key to allow the curtain to stop and complete the up travel setting of the curtain.

The down travel setting method specifically comprises the following steps:

B1, continuously pressing the down travel setting key to control the motor to bring the curtain to descend;

B2, when the curtain descends to the down travel position to be set by the user, releasing the down travel setting key to allow the curtain to stop and complete the down travel setting of the curtain.

Preferably, the travel setting method further comprises a third travel setting method, which is set by the up travel setting key and the down travel setting key.

Preferably, the third travel setting method specifically comprises the following steps:

C1, short-pressing the up travel setting key or short-pressing the down travel setting key to control the motor to bring the curtain to move;

C2, when the curtain moves to a third travel position to be set by the user, short-pressing the up travel setting key or the down travel setting key to control the curtain to stop, and then simultaneously long-pressing the up travel setting key and the down travel setting key to complete the third travel setting of the curtain.

Compared with the prior arts, the above system and method of the present disclosure have the following advantages: two physical travel setting keys are set on the curtain, and when the user needs to set the up and down travels of the curtain, it is not required to first match the remote controller and then learn how to control the remote controller but carry out travel setting simply by using the corresponding travel setting keys, leading to simple and convenient setting and avoiding mis-operations.

Figure 1:
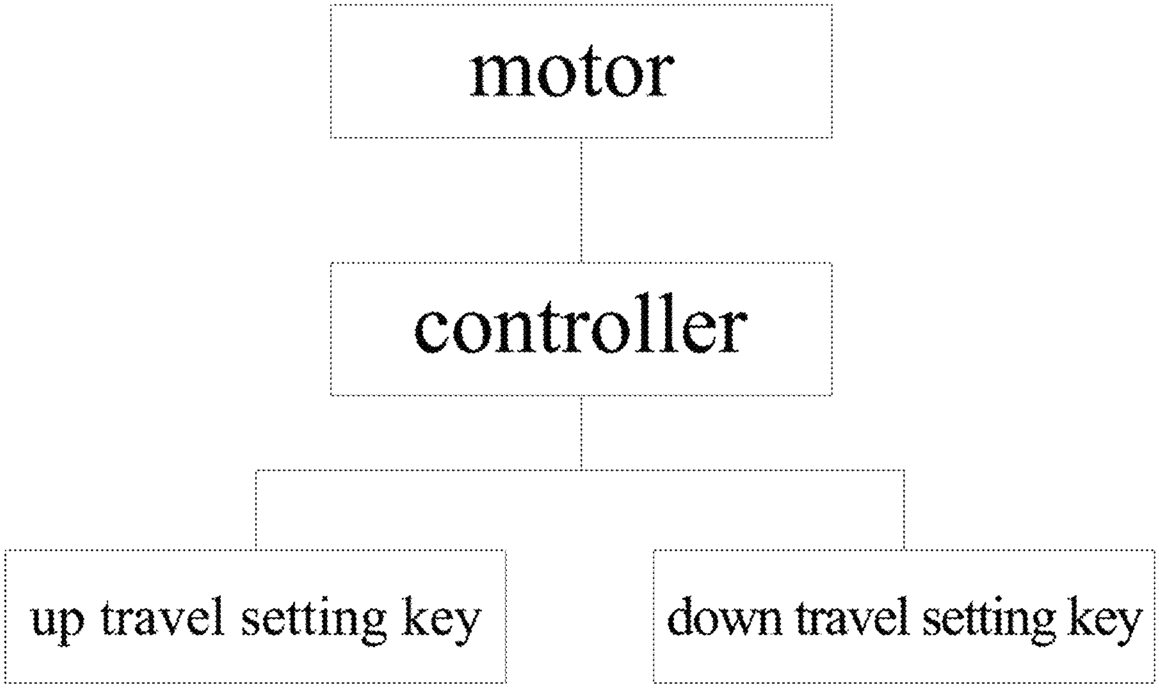
FIG. 1 is a block diagram illustrating a module connection of an electric curtain system according to the present disclosure.

Numerals of the drawings are described below: 1. mounting housing, 2. up travel setting key, and 3. down travel setting key.

DETAILED DESCRIPTIONS OF EMBODIMENTS

The embodiments of the present disclosure will be detailed below with examples thereof shown in the drawings. Similar or same numerals represent similar or same elements or elements having similar or same functions throughout the specification. The embodiments described by referring to the drawings are illustrative and are intended to explain the present disclosure rather than to limit the present disclosure.

Embodiment 1

There is provided an electric curtain system. As shown in FIG. 1, the electric curtain system comprises a motor and a controller and usually also comprises a remote controller. A matching key is set on a curtain to match the curtain by the remote controller, and then control the curtain by the remote controller. The above are operations of the conventional electric curtains in the prior arts. In the present embodiment, an up travel setting key 2 and a down travel setting key 3 are added on the basis of the conventional electric curtain. In this case, even when you cannot carry out remote controller matching nor use the remote controller, you can still perform the up and down travel setting of the curtain simply by using the up travel setting key 2 and the down travel setting key 3.

Figure 2:
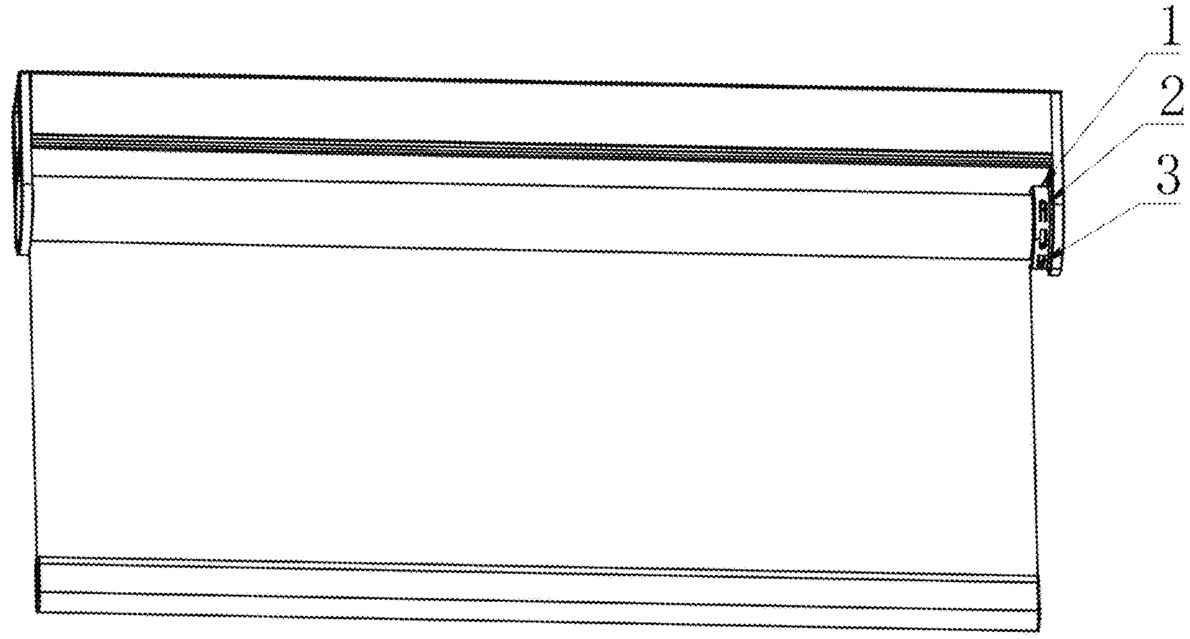
FIG. 2 is a structural schematic diagram illustrating an electric curtain according to the present disclosure.
Figure 3:
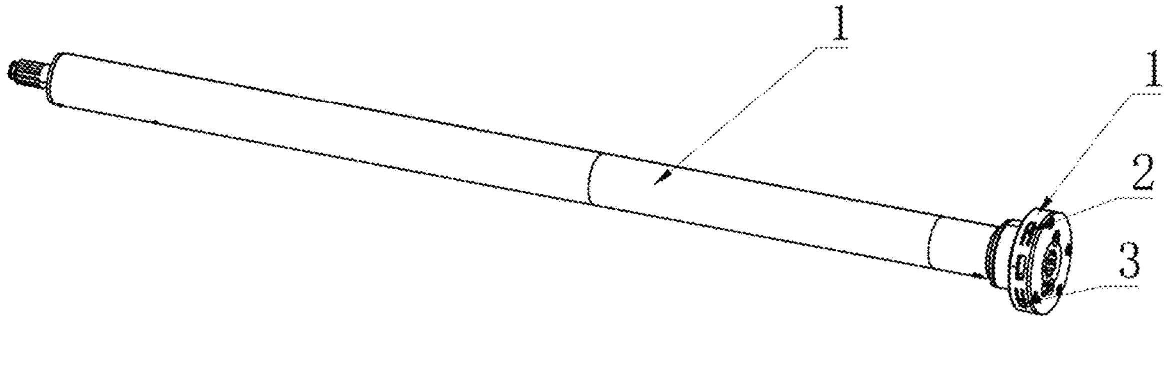
FIG. 3 is a structural schematic diagram illustrating a part of an electric curtain according to the present disclosure.

As shown in FIGS. 2 and 3, it is a real image of an electric curtain system in the present embodiment. The electric curtain system comprises a mounting housing 1 in which the motor and the controller are mounted. A control circuit board is further disposed in the mounting housing 1. The up travel setting key 2 and the down travel setting key 3 are disposed at a right side of the mounting housing 1 and electrically connected with the control circuit board. Further, the up travel setting key 2 and the down travel setting key 3 are disposed on a ring, increasing its aesthetics. Moreover, because they are outside the mounting housing 1, the user can operate easily.

The travel setting method of the above electric curtain system comprises an up travel setting method and a down travel setting method.

The up travel setting method comprises:

A1, short-pressing the up travel setting key 2 to control the motor to bring the curtain to rise;

A2, when the curtain rises to an up travel position to be set by the user, short-pressing the up travel setting key 2 or the down travel setting key 3 to control the curtain to stop, and then long-pressing the up travel setting key 2 to complete the up travel setting of the curtain.

The down travel setting method comprises:

B1, short-pressing the down travel setting key 3 to control the motor to bring the curtain to descend;

B2, when the curtain descends to a down travel position to be set by the user, short-pressing the up travel setting key 2 or the down travel setting key 3 to control the curtain to stop, and long-pressing the down travel setting key 3 to complete the down travel setting of the curtain.

In the above two methods, the short pressing refers to a press action with a press time less than 2 seconds; the long pressing refers to a press action with a press time greater than or equal to 2 seconds.

By the above travel setting method, the up and down travel setting can be carried out simply by using the up travel setting key 2 or the down travel setting key 3, without needing additional remote controller or additional operations.

Embodiment 2

This embodiment differs from the embodiment 1 in that the travel setting method of the embodiment 2 further comprises a third travel setting method. The third travel setting method comprises the following steps:

C1, short-pressing the up travel setting key 2 or short-pressing the down travel setting key 3 to control the motor to bring the curtain to move;

C2, when the curtain moves to a third travel position to be set by the user, short-pressing the up travel setting key 2 or the down travel setting key 3 to control the curtain to stop, and then simultaneously long-pressing the up travel setting key 2 and the down travel setting key 3 to complete the third travel setting of the curtain.

In the above method, the short pressing refers to a press action with a press time less than 2 seconds; the long pressing refers to a press action with a press time greater than or equal to 2 seconds.

With the third travel, the curtain will not be surely fully opened or closed but can be closed to the third travel position such as a sun shading position, bringing convenience to users.

Embodiment 3

This embodiment differs from the embodiment 2 in that the embodiment 3 further comprises a pause key which simplifies the operations. The up travel setting key 2 is used only for up travel and up travel setting, and the down travel setting key 3 is used only for down travel and down travel setting, and the pause key is used for pausing.

The up travel setting method comprises the following steps:

A1, short-pressing the up travel setting key 2 to control the motor to bring the curtain to rise;

A2, when the curtain rises to the up travel position to be set by the user, short-pressing the pause key to the curtain to stop and then long-pressing the up travel setting key 2 to complete the up travel setting of the curtain.

The down travel setting method comprises the following steps:

B1, short-pressing the down travel setting key 3 to control the motor to bring the curtain to descend;

B2, when the curtain descends to the down travel position to be set by the user, short-pressing the pause key to control the curtain to stop, and then long-pressing the down travel setting key 3 to complete the down travel setting of the curtain.

The third travel setting method comprises the following steps:

C1, short-pressing the up travel setting key 2 or short-pressing the down travel setting key 3 to control the motor to bring the curtain to move;

C2, when the curtain moves to a third travel position to be set by the user, short-pressing the pause key to control the curtain to stop, and then simultaneously long-pressing the up travel setting key 2 and the down travel setting key 3 to complete the third travel setting of the curtain.

In the above method, the short pressing refers to a press action with a press time less than 2 seconds; the long pressing refers to a press action with a press time greater than or equal to 2 seconds.

Embodiment 4

This embodiment differs from the embodiment 1 in that the up and down travel setting methods in the embodiment 4 are different.

The up travel setting method comprises the following steps:

A1, short-pressing the up travel setting key to control the motor to bring the curtain to rise;

A2, when the curtain rises to the up travel position to be set by the user, short-pressing the up travel setting key or the down travel setting key to control the curtain to stop and then double-clicking the up travel setting key to complete the up travel setting of the curtain.

The down travel setting method specifically comprises the following steps:

B1, short-pressing the down travel setting key to control the motor to bring the curtain to descend;

B2, when the curtain descends to the down travel position to be set by the user, short-pressing the up travel setting key or the down travel setting key to control the curtain to stop, and then double-clicking the down travel setting key to complete the down travel setting of the curtain.

Because the up and down travel setting can be confirmed only by double click, mis-operation can be avoided to some extent.

Embodiment 5

This embodiment differs from the embodiment 1 in that the up and down travel setting methods in the embodiment 5 are different.

The up travel setting method specifically comprises the following steps:

A1, continuously pressing the up travel setting key to control the motor to bring the curtain to rise;

A2, when the curtain rises to the up travel position to be set by the user, releasing the up travel setting key to allow the curtain to stop and complete the up travel setting of the curtain.

The down travel setting method specifically comprises the following steps:

B1, continuously pressing the down travel setting key to control the motor to bring the curtain to descend;

B2, when the curtain descends to the down travel position to be set by the user, releasing the down travel setting key to allow the curtain to stop and complete the down travel setting of the curtain.

Because the movement of the curtain can be controlled only by continuous pressing, mis-operation can be avoided as possible.

Embodiment 6

This embodiment differs from the embodiment 1 in that, in the embodiment 6, a control pull rope is disposed on the curtain, and the controller is connected with a control switch connected with the control pull rope. The control pull rope can control the up and down movement of the curtain, and the up travel setting key 2 and the down travel setting key 3 are disposed on a handle at a lower end of the control pull rope. The up travel setting key 2 and the down travel setting key 3 can be physically connected with the controller via a connection line or wirelessly communicated with the controller via a wireless communication module. If the wireless communication module is used for wireless communication, it can be set before leaving factory so that the up travel setting key 2 and the down travel setting key 3 can be connected with the controller before leaving factory. In this way, the user does not need to operate on the curtain mounting housing 1 for setting but performs a press action on the handle of the control pull rope. It is more convenient to set the up and down travels by the same method as in the embodiment 1. No redundant descriptions are made herein.

Embodiment 7

This embodiment differs from the embodiment 6 in that the up and down travel setting methods in the embodiment 7 are different from those in the embodiment 6.

The up travel setting method specifically comprises the following steps:

A1, long-pressing the up travel setting key to control the motor to bring the curtain to rise;

A2, when the curtain rises to the up travel position to be set by the user, long-pressing the up travel setting key or the down travel setting key to control the curtain to stop and then double-clicking the up travel setting key to complete the up travel setting of the curtain.

The down travel setting method specifically comprises the following steps:

B1, long-pressing the down travel setting key to control the motor to bring the curtain to descend;

B2, when the curtain descends to the down travel position to be set by the user, long-pressing the up travel setting key or the down travel setting key to control the curtain to stop and then double-clicking the down travel setting key to complete the down travel setting of the curtain.

Because the up and down travel setting keys are disposed an easily-reached position, the control is carried out by long press and double click. Even if the user accidentally touches the up and down travel setting keys when using the control pull rope to control the curtain to rise or descend, the up down travels will not be reset, which can prevent mis-operation well.

Although the embodiments of the present disclosure are illustrated and described as above, it can be understood that the above embodiments are illustrative and shall not be understood as limiting of the present disclosure. Persons of ordinary skill in the prior arts can make changes, modifications, substitutions and variations to the above embodiments within the scope of the present disclosure.

After reading the above specification, various changes and modifications will undoubtedly become apparent to those skilled in the arts. Therefore, the appended claims shall be regarded as covering all changes and modifications within the true intention and the scope of the present disclosure. Any and all equivalent changes and modifications within the scope of the appended claims shall fall within the intention and scope of the present disclosure.

The invention claimed is:

1. A travel setting method of an electric curtain system which comprises a motor and a controller, the controller being electrically connected with the motor, wherein the electric curtain system further comprises at least two travel setting keys, which are an up travel setting key and a down travel setting key respectively; the up travel setting key and the down travel setting key are both electrically connected with the controller, wherein the method comprises an up travel setting method and a down travel setting method; the up travel setting method is set by the up travel setting key and the down travel setting method is set by the down travel setting key, wherein the up travel setting method specifically comprises the following steps:

A1, short-pressing the up travel setting key to control the motor to bring the curtain to rise;

A2, when the curtain rises to an up travel position to be set by the user, short-pressing the up travel setting key or the down travel setting key to control the curtain to stop, and then long-pressing the up travel setting key to complete the up travel setting of the curtain;

the down travel setting method specifically comprises the following steps:

B1, short-pressing the down travel setting key to control the motor to bring the curtain to descend;

B2, when the curtain descends to a down travel position to be set by the user, short-pressing the up travel setting key or the down travel setting key to control the curtain to stop, and long-pressing the down travel setting key to complete the down travel setting of the curtain.

2. A travel setting method of an electric curtain system which comprises a motor and a controller, the controller being electrically connected with the motor, wherein the electric curtain system further comprises at least two travel setting keys, which are an up travel setting key and a down travel setting key respectively; the up travel setting key and the down travel setting key are both electrically connected with the controller, wherein the method comprises an up travel setting method and a down travel setting method; the up travel setting method is set by the up travel setting key and the down travel setting method is set by the down travel setting key, wherein the up travel setting method specifically comprises the following steps:

A1, short-pressing the up travel setting key to control the motor to bring the curtain to rise;

A2, when the curtain rises to the up travel position to be set by the user, short-pressing the up travel setting key or the down travel setting key to control the curtain to stop and then double-clicking the up travel setting key to complete the up travel setting of the curtain;

the down travel setting method specifically comprises the following steps:

B1, short-pressing the down travel setting key to control the motor to bring the curtain to descend;

B2, when the curtain descends to the down travel position to be set by the user, short-pressing the up travel setting key or the down travel setting key to control the curtain to stop, and then double-clicking the down travel setting key to complete the down travel setting of the curtain.

* * * * *